US008954993B2

(12) United States Patent
Kruglick

(10) Patent No.: US 8,954,993 B2
(45) Date of Patent: Feb. 10, 2015

(54) LOCAL MESSAGE QUEUE PROCESSING FOR CO-LOCATED WORKERS

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/009,101

(22) PCT Filed: Feb. 28, 2013

(86) PCT No.: PCT/US2013/028262
§ 371 (c)(1),
(2) Date: Sep. 30, 2013

(87) PCT Pub. No.: WO2014/133522
PCT Pub. Date: Sep. 4, 2014

(65) Prior Publication Data
US 2014/0245326 A1    Aug. 28, 2014

(51) Int. Cl.
*G06F 13/00*    (2006.01)
*G06F 9/54*    (2006.01)
(52) U.S. Cl.
CPC .................................... *G06F 9/546* (2013.01)
USPC ............................... 719/313; 719/314; 718/1
(58) Field of Classification Search
CPC ............................. G06F 9/45533; G06F 9/546
USPC ....................................... 718/1; 719/313, 314
See application file for complete search history.

(56) References Cited

U.S. PATENT DOCUMENTS

| 7,337,214 | B2 * | 2/2008 | Douglass et al. ............. 709/214 |
| 7,536,650 | B1 | 5/2009 | Robertson et al. |
| 7,624,250 | B2 | 11/2009 | Lau et al. |
| 7,673,302 | B1 * | 3/2010 | Katzer ......................... 718/101 |
| 2007/0094664 | A1 * | 4/2007 | So et al. ....................... 718/103 |
| 2008/0270536 | A1 * | 10/2008 | Keesey et al. ................ 709/203 |
| 2010/0191783 | A1 | 7/2010 | Mason et al. |
| 2011/0213991 | A1 | 9/2011 | Wolfe et al. |
| 2013/0007183 | A1 | 1/2013 | Sorenson, III et al. |

FOREIGN PATENT DOCUMENTS

EP    1474746 A1    11/2004

OTHER PUBLICATIONS

Kessler et al., "Hot Chips: A Symposium on High Performance Chips", Keynote address Cavium 32 core OCTEON II CN68xx, Created on Aug. 17-19, 2011.
"Broadcom Ethernet Network Controller Enhanced Virtualization Functionality", Created on Oct. 2009.
"RabbitMQ tutorial",Pivotal, retrieved on Sep. 22, 2013.

(Continued)

*Primary Examiner* — Andy Ho
(74) *Attorney, Agent, or Firm* — Turk IP Law, LLC

(57) ABSTRACT

Technologies are provided for locally processing queue requests from co-located workers. In some examples, information about the usage of remote datacenter queues by co-located workers may be used to determine one or more matched queues. Messages from local workers to a remote datacenter queue classified as a matched queue may be stored locally. Subsequently, local workers that request messages from matched queues may be provided with the locally-stored messages.

23 Claims, 7 Drawing Sheets

(56) References Cited

OTHER PUBLICATIONS

"SQS: Super Queue Service", Amazon Web Services Blog posted on May 4, 2007.
"Threading Building Blocks", retrieved on Sep. 22, 2013.
"What's new", Amazon Simple Queue Service Developer Guide first released on Jan. 1, 2008.
Greenberg et al., "VL2: a scalable and flexible data center network," SIGCOMM'09, Barcelona, Spain, No. 3 (2011):95-104, Conference on Aug. 17-21, 2009.
Day, "Burrow—Message Queue", A message queue service designed for the cloud and registered on Feb. 22, 2011.
Contreras et al, "Characterizing and Improving the Performance of Intel Threading Building Blocks." In Workload Characterization, 2008. IISWC 2008. IEEE International Symposium on, 57-66, Conferences on Sep. 14-16, 2008.
Mike, "Python Concurrency: An Example of a Queue", Posted on Aug. 1, 2012.
Zhang-Shen et al., "Designing a Predictable Internet Backbone with Valiant Load-Balancing," in Quality of Service—IWQoS 2005, ed. Hermann Meer and Nina Bhatti, vol. 3552 (Berlin, Heidelberg: Springer Berlin Heidelberg, 2005), 178-192, IFIP International Federation for Information Processing Jan. 1, 2005.
Benson et al., "Network Traffic Characteristics of Data Centers in the Wild",University of Wisconsin—Madison Microsoft Research Redmond, IMC'10 Melbourne, Australia, Presented on Nov. 1-3, 2010.
International Search Report and Written Opinion for PCT/US13/28262, filed Feb. 28, 2013 mailed May 9, 2013.

* cited by examiner

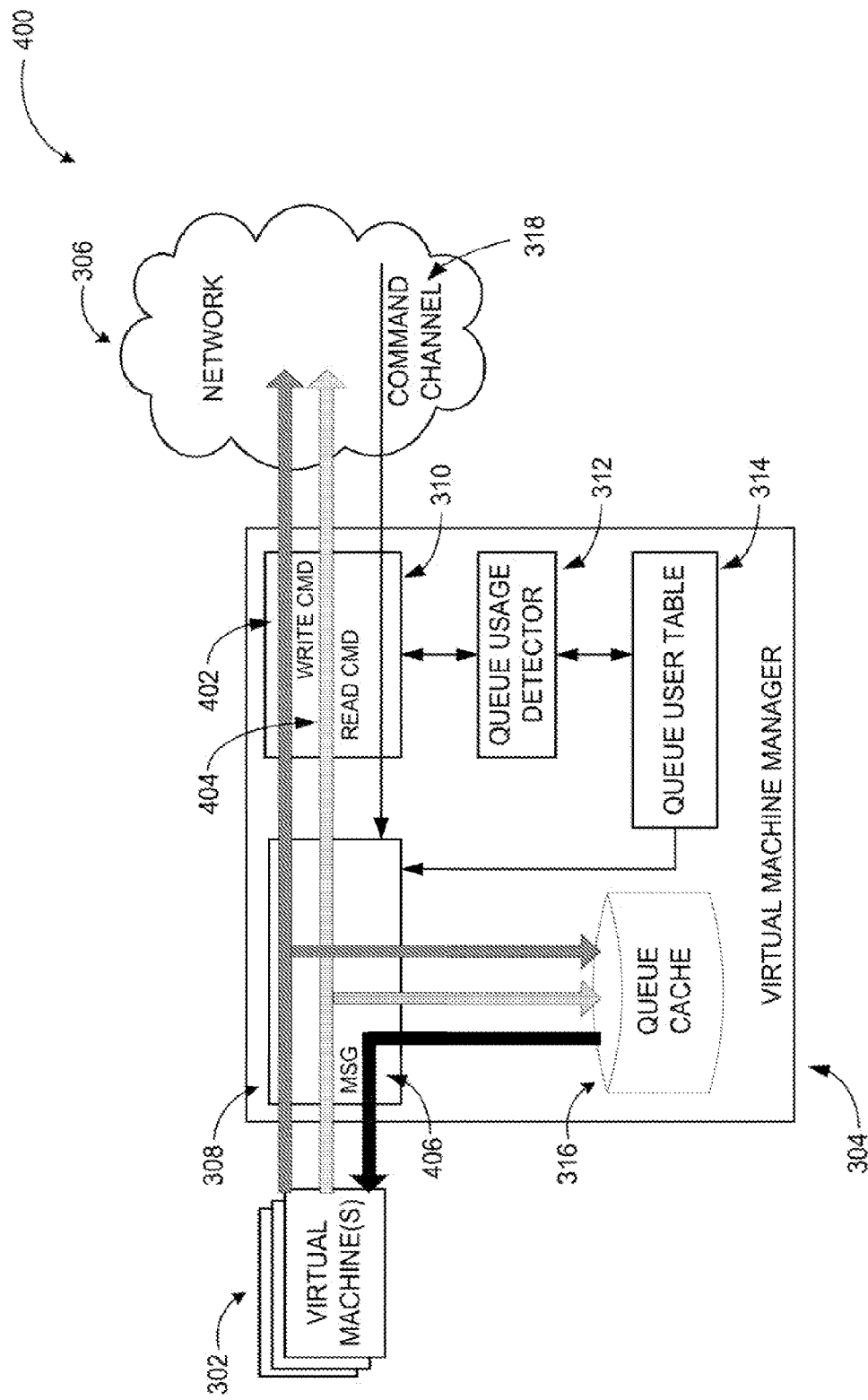

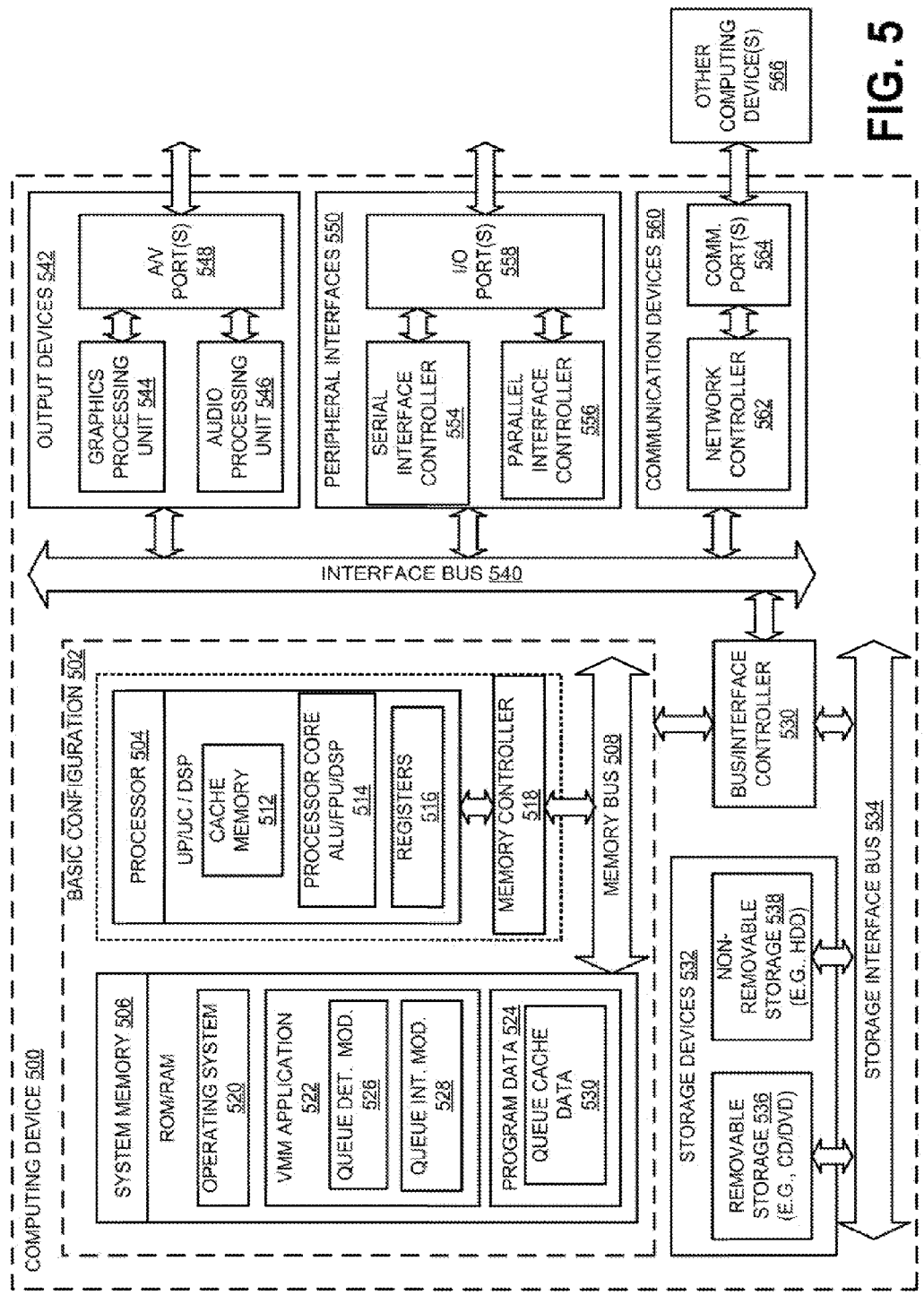

US 8,954,993 B2

LOCAL MESSAGE QUEUE PROCESSING FOR CO-LOCATED WORKERS

This Application is the National Stage filing under 35 U.S.C. §371 of PCT Application Ser. No. PCT/US2013/028262 filed on Feb. 28, 2013. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Efficient management of interacting threads and workers needs fine granularity and awareness of process state and newer processors offer hardware acceleration for thread management. When interacting threads share hardware, various optimizations may be applied to hand off demand between the two. These improvements are typically available if smooth and fast worker handoff can be established between the interacting threads but they allow improvements like pipeline interleaving and fast task switching on successful speculative execution.

Meanwhile, datacenter multi-worker architectures are currently highly network-centric, designed around multiple minimum size worker/service instances that intercommunicate via messaging or queues so that multiple source workers can assign tasks onto a queue while multiple workers pull tasks off the queue to turn them into the next stage product output. Thus, existing multicore software can use multiple cores well. Existing web services, however, are designed to communicate via messaging capacities like message queues so even if two web services are on neighboring cores they send data between each other via the network—via a trip through at least a virtual router at the Virtual Machine Manager (VMM) level. This approach may be about 4-6 orders of magnitude slower than using intercore hardware.

SUMMARY

The present disclosure generally describes techniques for locally processing queue requests from co-located workers.

According to some examples, a method is provided for locally processing queue requests from co-located workers. The method may include detecting a producer worker at a first server sending a first message to a datacenter queue at least partially stored at a second server, storing the first message at the first server, detecting a consumer worker at the first server sending a message request to the datacenter queue, and providing the stored first message to the consumer worker in response to the message request.

According to other examples, a virtual machine manager (VMM) is provided for locally processing queue requests from co-located workers. The VMM may include a queue usage detector module and a processing module. The queue usage detector module may be configured to detect a producer worker at a first server sending a first message to a datacenter queue at least partially stored at a second server and detect a consumer worker at the first server sending a message request to the datacenter queue. The processing module may be configured to store the first message at the first server and provide the stored first message to the consumer worker in response to the message request.

According to further examples, a cloud-based datacenter is provided for locally processing queue requests from co-located workers. The datacenter may include a first and a second virtual machine (VM) operable to be executed on one or more physical machines and a datacenter controller. The datacenter controller may be configured to detect a producer worker executing on the first VM and sending a first message to a datacenter queue at least partially stored at a first datacenter location, store the first message at a second datacenter location different from the first, detect a consumer worker executing on the second VM and sending a message request to the datacenter queue, and provide the stored first message to the consumer worker in response to the message request, where the message is stored and provided from within a server local to the producer worker and the consumer worker.

According to yet further examples, a computer readable medium may store instructions for locally processing queue requests from co-located workers. The instructions may include detecting a producer worker at a first server sending a first message to a datacenter queue at least partially stored at a second server, storing the first message at the first server, detecting a consumer worker at the first server sending a message request to the datacenter queue, and providing the stored first message to the consumer worker in response to the message request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates the operation of the example virtual machine manager of FIG. 3;

DETAILED DESCRIPTION

Figure 1:
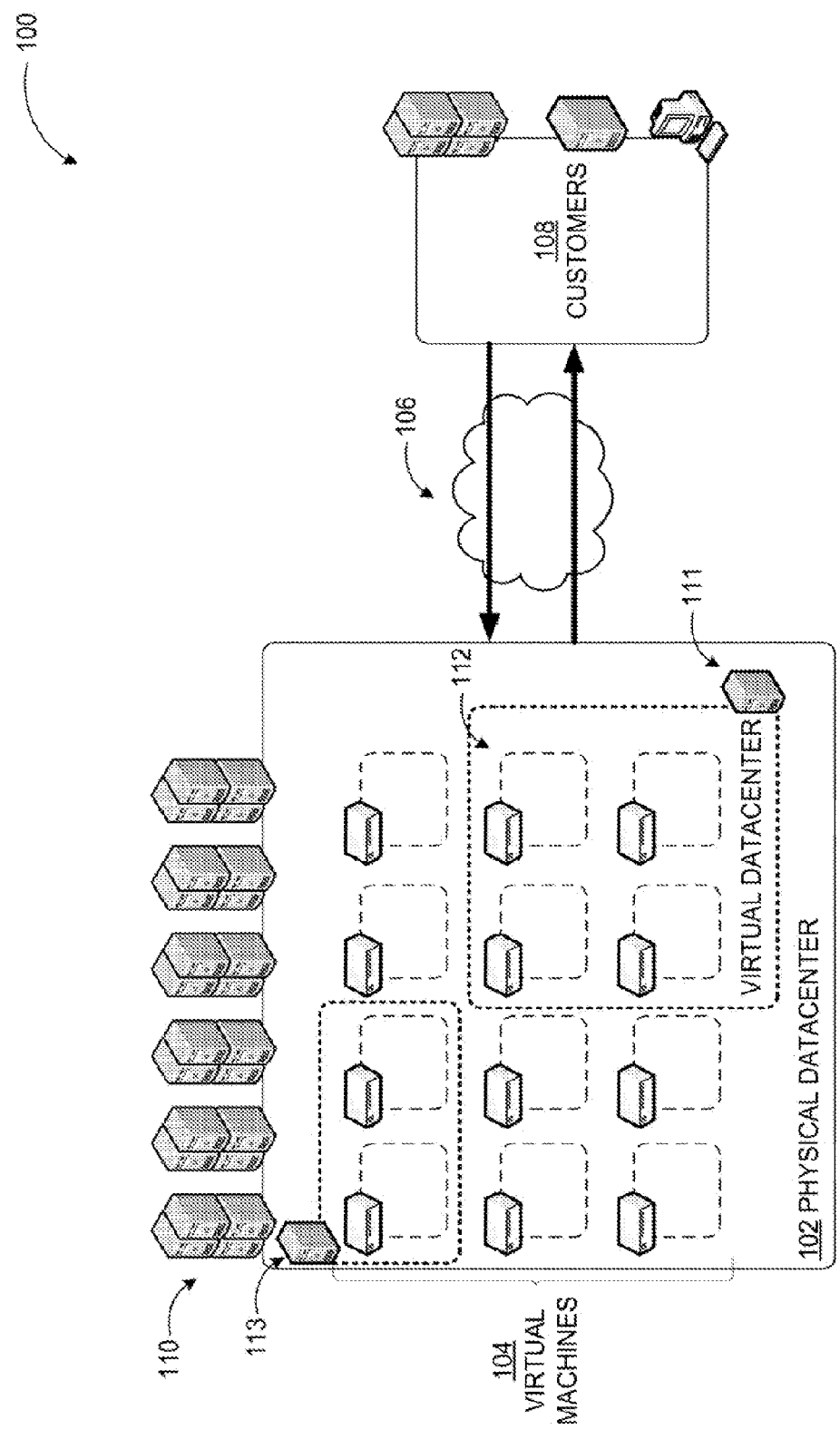
FIG. 1 illustrates an example datacenter-based system where local processing of queue requests from co-located workers may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to locally processing queue requests from co-located workers.

Briefly stated, technologies are generally described for locally processing queue requests from co-located workers. In some examples, information about the usage of remote datacenter queues by co-located workers may be used to determine one or more matched queues. Messages from local workers to a remote datacenter queue classified as a matched queue may be stored locally. Subsequently, local workers that request messages from matched queues may be provided with the locally-stored messages.

FIG. 1 illustrates an example datacenter-based system where local processing of queue requests from co-located workers may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be used as a virtual datacenter. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Figure 2:
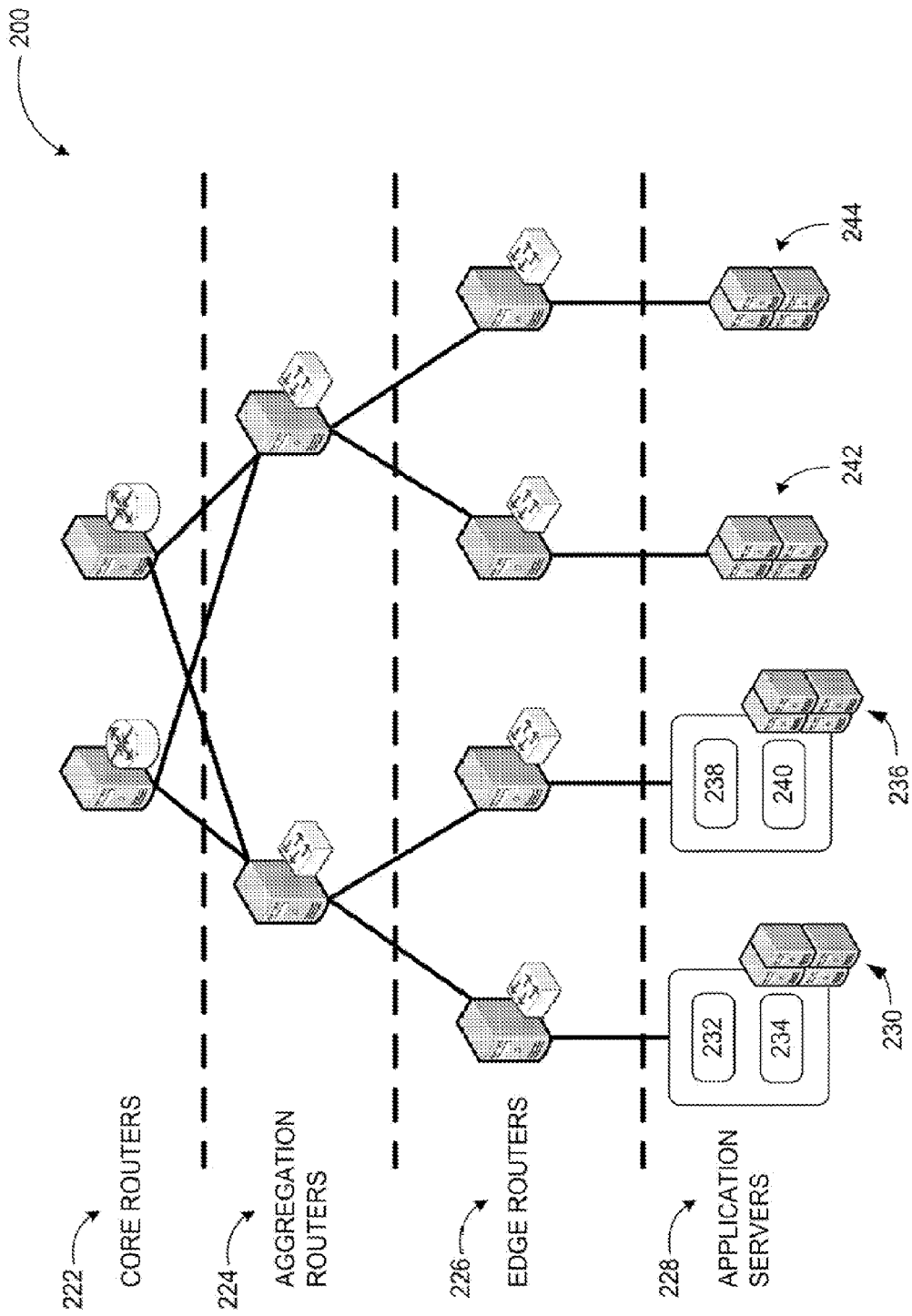
FIG. 2 illustrates an example datacenter-based system having multiple co-located workers.

FIG. 2 illustrates an example datacenter-based system having multiple co-located workers, arranged in accordance with at least some embodiments described herein.

As shown in a diagram 200, a datacenter (e.g., the physical datacenter 102 in FIG. 1) may include one or more layers of servers and routers, which may be arranged in a hierarchical fashion. The datacenter shown in the diagram 200 has a network of three router layers with the datacenter being a four-layer datacenter, although in other embodiments a datacenter may have more or fewer layers. The datacenter may include one or more application servers 228. In some embodiments, the application servers 228 may be configured to provide virtual machines (e.g., the virtual machines 104 described above in relation to FIG. 1) and/or execute one or more customer applications. The datacenter may also include one or more edge routers 226 that reside in the first network layer, where each edge router may couple to one or more of the application servers 228. The edge routers 226 in turn may couple to one or more aggregation routers 224, which may reside in a second layer of the network. In some embodiments, each of the aggregation routers 224 may couple to two or more of the edge routers 226 and serve to combine or "aggregate" the network traffic from the connected edge routers. Finally, each of the aggregation routers 228 may couple to one or more core routers 222 in a third network layer.

As described above, the application servers 228 may be configured to provide virtual machines on which customer applications may execute. A customer application may be configured to execute as one or more virtual machine instances, also known as workers, and in some embodiments an application server may be configured to execute one or more workers. For example, an application server 230 may be configured to execute workers 232 and 234, and an application server 236 may be configured to execute workers 238 and 240. As a result, an individual application server (e.g., the application server 230 or 236) may have multiple workers co-located and executing on the same hardware. If a particular application server includes multi-core processors (processors having multiple processing cores integrated on the same die), different processing cores may execute different virtual machines and different workers on the same processor. For example, different workers may each be configured to execute on different virtual machines, where the virtual machines are configured to execute on the same physical hardware (i.e., processor or server). In some cases, the different processing cores may execute the different virtual machines/workers at approximately the same time.

In some embodiments, a particular worker may be responsible for executing a particular process, function, or series of functions, and multiple workers may collaborate to accomplish more complex tasks or processes. For example, one worker may generate data or information for further processing. This worker, known as a producer worker, may package the generated information into one or more messages. Another worker, known as a consumer worker, may then retrieve the message(s), extract the information in the message(s), and perform some work on the information. The consumer worker may then produce result(s) and/or generate other messages for further processing.

To facilitate message handling and transfer, the messages generated by producer workers may be stored at one or more datacenter queues. For example, datacenter queues may be stored at queue servers 242 and/or 244. Consumer workers may then retrieve messages from the queue(s) for processing. In some embodiments, each individual customer application may have an associated datacenter queue. Workers executing as part of a particular customer application may store and/or retrieve messages from the datacenter queue associated with that particular customer application.

In the diagram 200, the application servers on which workers execute (e.g., the servers 230 and 236) may be different from the application servers on which the datacenter queues reside (e.g., the queue servers 242 and 244). In this situation, a message generated by a producer worker may traverse the entire network (e.g., the edge routers 226, the aggregation routers 224, and the core routers 222) in order to be placed on a datacenter queue. For example, a message generated by a producer worker executing on virtual machine 232 may be routed through the edge routers 226, the aggregation routers 224, and the core routers 222 before reaching one of the queue servers 242 or 244. Similarly, a message retrieved by a consumer worker from a datacenter queue may also have to traverse the entire network, as would each request for such messages or lists of messages.

As discussed above, an application server having multi-core processors may be configured to execute multiple, different workers. In some embodiments, a producer worker and a consumer worker may both execute on the same application server (e.g., the workers 232 and 234 on the application server 230) and store/receive messages from the same datacenter queue. If the datacenter queue is stored at another server (e.g., the queue server 242), then produced and consumed messages may traverse the entire network, even though the producer and consumer workers may be co-located on the same server or even the same multi-core processor. As a result, message processing may be relatively slow as compared to using local message handling, and many of the advantages of multi-core systems, such as thread management hardware acceleration or multiprocessor load balancing optimizations, may be lost due to network delays.

Figure 3:
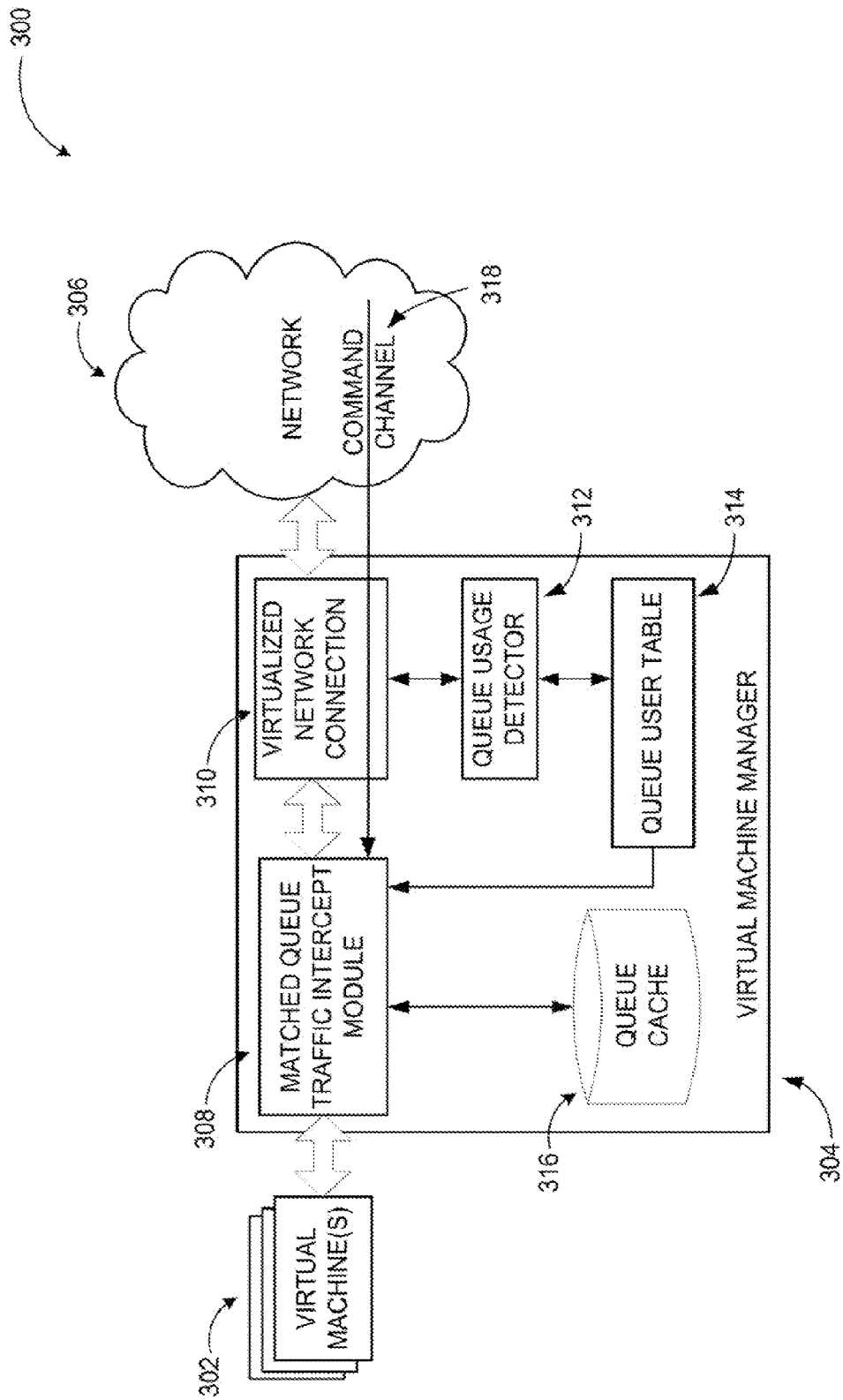
FIG. 3 illustrates an example virtual machine manager implementing local processing of queue requests from co-located workers.

FIG. 3 illustrates an example virtual machine manager implementing local processing of queue requests from co-located workers, arranged in accordance with at least some embodiments described herein.

According to a diagram 300, a virtual machine manager (VMM) 304 may mediate communications between virtual machines 302 and a network 306. In some embodiments, the VMM 304 may be associated with a particular application server in a datacenter, such as the application server 230 in FIG. 2. The virtual machines 302 may execute one or more producer and/or consumer workers (e.g., the workers 232 and 234 in FIG. 2), and the network 306 may correspond to the rest of the datacenter (e.g., the edge routers 226, the aggregation routers 224, and/or the core routers 222) or to an external network.

In some embodiments, producer workers executing on the virtual machines 302 may generate messages containing data for further processing. The messages may then be transmitted through the VMM 304 for forwarding to a datacenter queue stored at a different server (e.g., the queue servers 242 or 244 in FIG. 2). The VMM 304 may forward the messages through a virtualized network connection 310 to the datacenter queue, via the network 306.

While forwarding the messages to the datacenter queue, the VMM 304 may also observe network traffic through the virtualized network connection using a queue usage detector 312. The queue usage detector 312 may detect outgoing messages to queues (e.g., messages generated by producer workers executing in the virtual machines 302) and identify the producer workers and queues associated with those outgoing messages. The queue usage detector 312 may also detect message requests to queues (e.g., requests sent by consumer workers executing in the virtual machines 302) and identify the consumer workers and queues associated with those message requests. Detection may be achieved by observing network destinations associated with datacenter queues, which are often run by the datacenter. Detection may alternately be achieved by observing message headers or formats and recognizing queue commands, identities, or sessions. Detection may involve altering one or more settings within the hardware virtualization support of a processor, such as setting bits in the IOMap that will ensure the VMM receives a chance to handle messages passed to the network.

A queue user table 314 may then be constructed or updated based on the observed queue usage information. The queue user table 314 may include information about producer workers executing on the virtual machines 302, consumer workers executing on the virtual machines 302, and the queues associated with each worker. The VMM 304 may then use the queue user table to determine matching local producer/consumer worker pairs by identifying messages (from a local producer worker) and requests (from a local consumer worker) to the same datacenter queue. This datacenter queue may be known as a "matched queue".

Once one or more matched queues have been identified, matched queue information may be provided to a matched queue traffic intercept module 308. In some embodiments, outgoing messages and message requests to datacenter queues may be routed through the intercept module 308. The intercept module 308 may intercept outgoing messages to matched queues, store the intercepted messages in a queue cache 316, and provide stored messages from the queue cache 316 in response to message requests to the matched queues. This may increase the speed of message handling between local producer and consumer workers, because local consumer workers may receive messages from the local queue cache 316 instead of a remote datacenter queue stored on a relatively distant server. A command channel 318 may allow datacenter queues to relay certain commands to be performed on the queue cache 316.

FIG. 4 illustrates the operation of the example virtual machine manager of FIG. 3, arranged in accordance with at least some embodiments described herein.

According to a diagram 400, a producer worker executing on the virtual machines 302 may generate a message intended for a datacenter queue stored at a different server. The producer worker may transmit the message as a write command 402 through the VMM 304 for the datacenter queue. When the write command 402 reaches the VMM 304, it may first pass through the matched queue traffic intercept module 308. The intercept module 308 may forward the write command 402 on to the virtualized network connection 310 and henceforth to the network 306 and the remote datacenter queue. However, the intercept module may also determine if the write command 402 is intended for a matched queue (as described above). If so, the intercept module 308 may divert a copy of the write command 402 to the queue cache 316 in addition to forwarding the write command 402 to the virtualized network connection 310. In some cases the forwarded write command may be delayed to provide an opportunity for local consumption and deleted if the message is consumed locally within a predefined time period. The copy of the write command 402 may then be executed on the queue cache 316, writing the message generated by the producer worker into the queue cache 316.

A consumer worker executing on the virtual machines 302 may then request a message from the same datacenter queue via a read command 404. The read command 404, like the write command 402, may be transmitted to the VMM 304 for forwarding to the datacenter queue, and may pass through the intercept module 308. The intercept module 308 may forward the read command 404 on, but may also determine that the read command 404 is intended for a matched queue. The intercept module 308 may then also divert a copy of the read command 404 to the queue cache 316, as with the write command 402 described above. The copy of the read command 404 may then be executed on the queue cache 316, which may return a message 406 to the consumer worker. In some embodiments, the message 406 may be the message written by the write command 402. As a result, messages may be passed between producer workers and consumer workers both executing on the virtual machines 302 without incurring network delays from having to traverse the datacenter network, as described above in relation to FIG. 2. At the same time, the remote datacenter queue may still be updated based on the write command 402 and the read command 404 from the local workers, because the intercept module 308 forwards those commands on in addition to copying them for the local queue cache 316. In other examples, the read command may not be forwarded if it can be satisfied locally. This approach may provide efficiency if the write command has been delayed as discussed above.

The local queue cache 316 may store and provide messages from and to workers on the virtual machines 302; in effect serving as a local datacenter queue that can respond to requests from local consumer workers significantly faster than the remote datacenter queue. As described above, the intercept module 308 may direct the write command 402 and the read command 404 to both the remote datacenter queue and the local queue cache 316. In fact, in some embodiments the queue cache 316 may include a partial copy or an entire copy of a remote datacenter queue.

In order to assure that the remote datacenter queue and the local queue cache 316 remain reasonably consistent, commands from the remote datacenter queue may be provided to the VMM 304 via the command channel 318. For example, suppose that the write command 402 places a particular message on both the remote datacenter queue and the queue cache 316. Another consumer worker having access to the remote datacenter queue but not executing on the virtual machines 302 may be able to request the message. If the other consumer worker completes processing of the message, it may send a delete command to the remote datacenter queue deleting the message. In order to assure that the message copy on the queue cache 316 is also deleted, the remote datacenter queue may transmit a delete command via the command channel 318 to delete the message copy on the queue cache 316.

In some embodiments, the VMM 304 may also assist in maintaining consistency between the remote datacenter queue and the local queue cache 316. For example, the VMM 304 may be configured to forward a message request from a consumer worker to the remote datacenter queue if the remote datacenter queue is configured to hide the requested message after receiving the message request. This functionality may prevent another consumer worker from receiving the same requested message and thus duplicate processing. If the remote datacenter queue does not implement this functionality, the VMM 304 may refrain from forwarding the message request.

Figure 5:
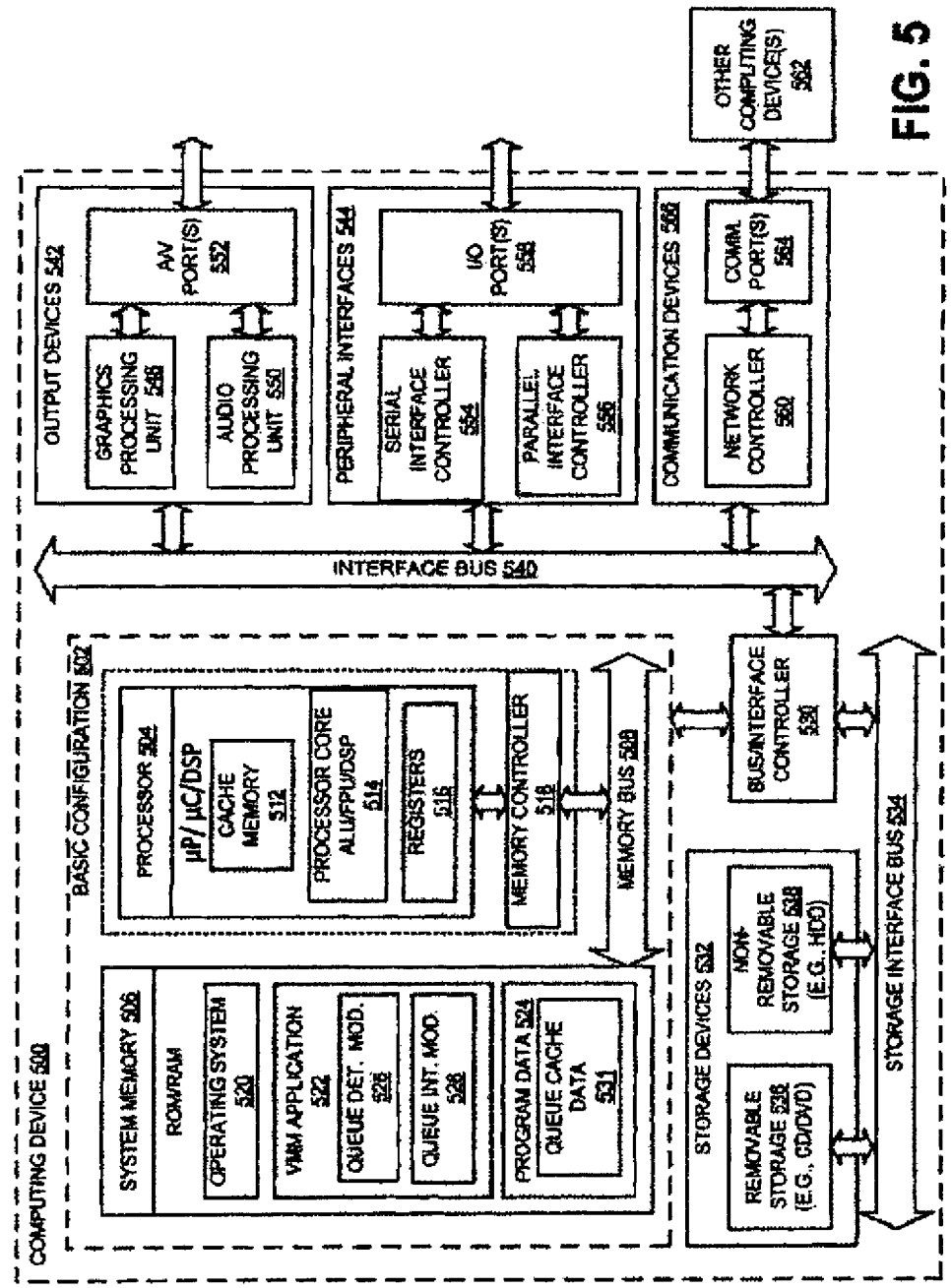
FIG. 5 illustrates a general purpose computing device, which may be used to provide local processing of queue requests from co-located workers.

FIG. 5 illustrates a general purpose computing device, which may be used to provide local processing of queue requests from co-located workers, arranged in accordance with at least some embodiments described herein.

For example, the computing device 500 may be used to implement local message queue processing for co-located workers as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtual machine manager (VMM) application 522, and program data 524. The VMM application 522 may include a queue detection module 526 for detecting queue usage of local workers and a queue intercept module 528 for intercepting messages and message requests from local workers to remote datacenter queues as described herein. The program data 524 may include, among other data, queue cache data 530 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing local message queue processing for co-located workers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
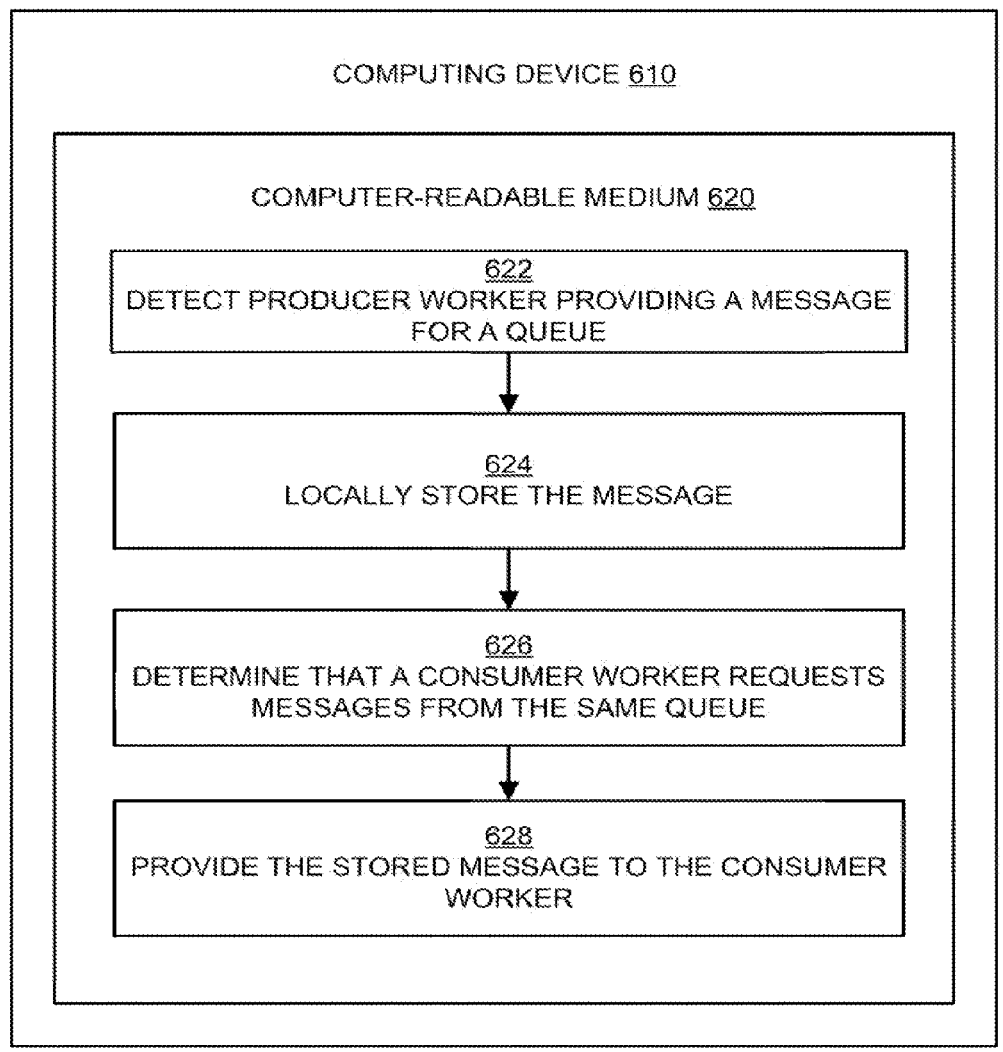
FIG. 6 is a flow diagram illustrating an example method for locally processing queue requests from co-located workers that may be performed by a computing device such as the computing device in FIG. 5.

FIG. 6 is a flow diagram illustrating an example method for locally processing queue requests from co-located workers that may be performed by a computing device such as the some computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for locally processing queue requests from co-located workers may begin with block 622, "DETECT PRODUCER WORKER PROVIDING A MESSAGE FOR A QUEUE", where a queue usage detector (e.g., the queue usage detector 312) may detect a local producer worker (e.g., a producer worker executing on the virtual machines 302) providing messages for a remote datacenter queue. For example, the queue usage detector may detect a write command (e.g., the write command 402) from a local worker destined for a remote datacenter queue. In some embodiments, if the local producer worker and/or the remote datacenter queue are known to be associated with a matched queue as described above, an intercept module (e.g., the intercept module 308) may copy the message as described above in FIG. 4.

Block 622 may be followed by block 624, "LOCALLY STORE THE MESSAGE", where the intercept module may send the copied message to a local queue cache (e.g., the queue cache 316) for local storage.

Block 624 may be followed by block 626, "DETERMINE THAT A CONSUMER WORKER REQUESTS MESSAGES FROM THE SAME QUEUE", where the intercept module may determine that a local consumer worker (e.g., a consumer worker executing on the virtual machines 302) is requesting a message from the same remote datacenter queue. For example, the intercept module may determine that the consumer worker and/or the remote datacenter queue are associated with the same matched queue, as described above. The intercept module may then copy the message request, as described above in FIG. 4.

Finally, block 626 may be followed by block 628, "PROVIDE THE STORED MESSAGE TO THE CONSUMER WORKER", where the intercept module may send the copied message request to the local queue cache, which in turn may provide the message stored in block 624 to the requesting consumer worker, as described above in relation to FIG. 4.

Figure 7:
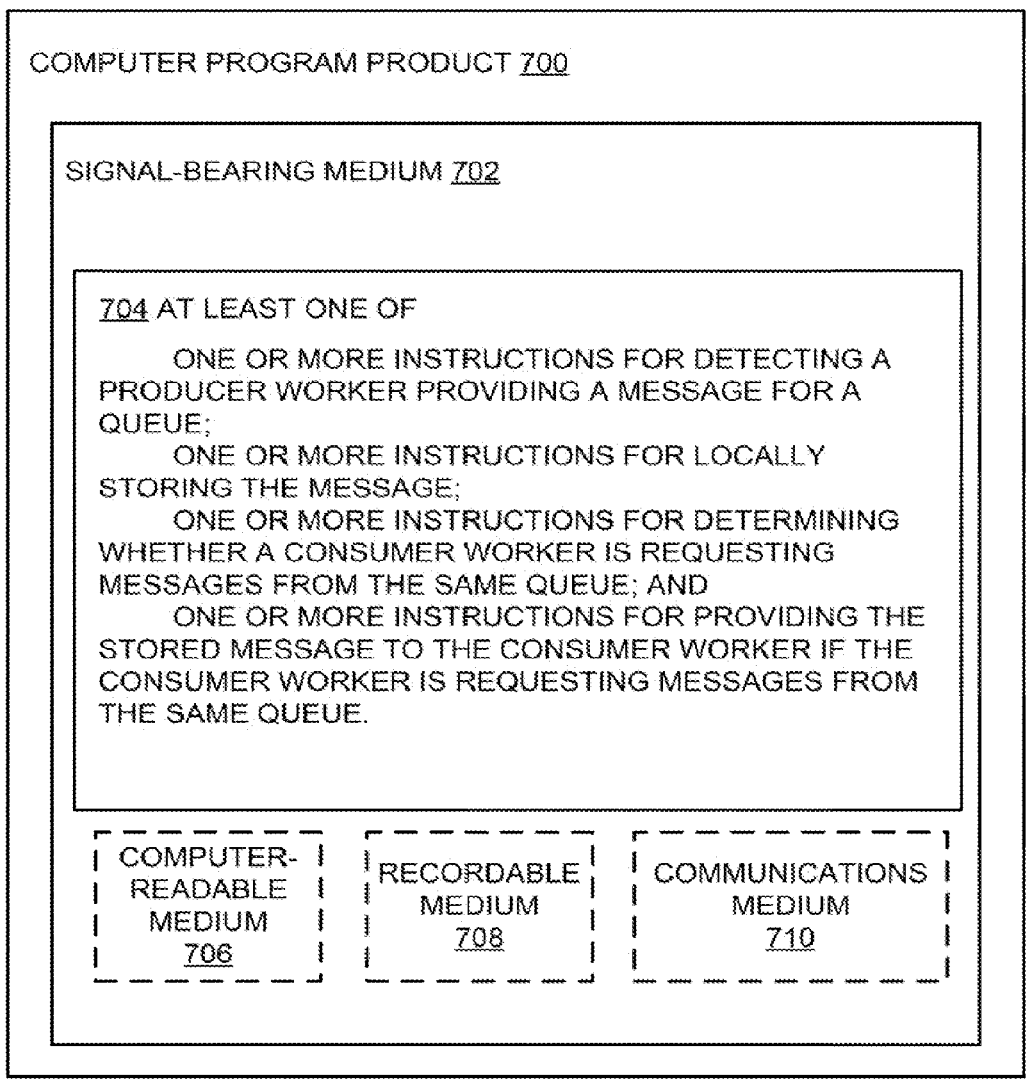
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the VMM application 522 may undertake one or more of the tasks shown in FIG. 7 in response to the instructions 704 conveyed to the processor 504 by the medium 702 to perform actions associated with local message queue processing for co-located workers as described herein. Some of those instructions may include, for example, detecting a producer worker providing a message for a queue, locally storing the message, determining whether a consumer worker is requesting messages from the same queue, and/or providing the stored message to the consumer worker if the consumer worker is requesting messages from the same queue, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard). The computer program product 700 may be delivered as a module for addition to a VMM such as a VMWare Installation Bundle (VIB).

According to some examples, a method for locally processing queue requests from co-located workers in a datacenter may include detecting a producer worker at a first server sending a first message to a datacenter queue at least partially stored at a second server, storing the first message at the first server, detecting a consumer worker at the first server sending a message request to the datacenter queue, and providing the stored first message to the consumer worker in response to the message request.

According to some embodiments, the method may further include intercepting the first message sent by the producer worker before storing the first message and/or storing the first message at the first server in a queue cache. The queue cache may include a copy or a partial copy of the datacenter queue. The method may further include building a table of queue usage based on at least one observed datacenter queue request and/or observing the at least one observed datacenter queue request.

According to other embodiments, the producer worker and the consumer worker may be co-located on a multi-core device at the first server and/or executed on different virtual machines, the different virtual machines configured to execute on the same physical hardware. The method may further include receiving a signal from a command channel associated with the datacenter queue and modifying the stored first message in response to receiving the signal. Modifying the stored first message may include deleting the first message.

According to further embodiments, the method may further include intercepting the message request from the consumer worker to the datacenter queue, forwarding the message request to the datacenter queue if a first criterion is met, and refraining from forwarding the message request to the datacenter queue if the first criterion is not met. The first criterion may include whether the datacenter queue is configured to hide a requested message upon receiving the message request from the consumer worker.

According to other examples, a virtual machine manager (VMM) for locally processing queue requests from co-located workers in a datacenter may include a queue usage detector module and a processing module. The queue usage detector module may be configured to detect a producer worker at a first server sending a first message to a datacenter queue at least partially stored at a second server and detect a consumer worker at the first server sending a message request to the datacenter queue. The processing module may be configured to store the first message at the first server and provide the stored first message to the consumer worker in response to the message request.

According to some embodiments, the processing module may be further configured to intercept the first message sent by the producer worker before storing the first message. The VMM may further include a queue cache configured to store the first message. The queue cache may include a copy or a partial copy of the datacenter queue. The processing module may be further configured to build a table of queue usage based on at least one observed datacenter queue request, and the queue usage detector module may be configured to observe the at least one observed datacenter queue request.

According to other embodiments, the producer worker and the consumer worker may be co-located on a multi-core device at the first server and/or executed on different virtual machines, the different virtual machines configured to execute on the same physical hardware. The processing module may be further configured to receive a signal from a command channel associated with the datacenter queue and modify the stored first message in response to receiving the signal. Modifying the stored first message may include deleting the first message.

According to further embodiments, the processing module may be further configured to intercept the message request from the consumer worker to the datacenter queue, forward the message request to the datacenter queue if a first criterion is met, and refrain from forwarding the message request to the datacenter queue if the first criterion is not met. The first criterion may include whether the datacenter queue is configured to hide a requested message upon receiving the message request from the consumer worker.

According to further examples, a cloud-based datacenter is provided for locally processing queue requests from co-located workers. The datacenter may include a first and a second virtual machine (VM) operable to be executed on one or more physical machines and a datacenter controller. The datacenter controller may be configured to detect a producer worker executing on the first VM and sending a first message to a datacenter queue at least partially stored at a first datacenter location, store the first message at a second datacenter location different from the first, detect a consumer worker executing on the second VM and sending a message request to the datacenter queue, and provide the stored first message to the consumer worker in response to the message request, where the message is stored and provided from within a server local to the producer worker and the consumer worker.

According to some embodiments, the controller may be further configured to intercept the first message sent by the producer worker before storing the first message and/or store the first message in a queue cache at the second datacenter location. The queue cache may include a copy or a partial copy of the datacenter queue. The controller may be further configured to build a table of queue usage based on at least one observed datacenter queue request and/or observe the at least one observed datacenter queue request.

According to other embodiments, the producer worker and the consumer worker may be co-located on a multi-core device at the first datacenter location and/or executed on different virtual machines, the different virtual machines configured to execute on the same physical hardware. The controller may be further configured to receive a signal from a command channel associated with the datacenter queue and modify the stored first message in response to receiving the signal. Modifying the stored first message may include deleting the first message.

According to further embodiments, the controller may be further configured to intercept the message request from the consumer worker to the datacenter queue, forward the message request to the datacenter queue if a first criterion is met, and refrain from forwarding the message request to the datacenter queue if the first criterion is not met. The first criterion may include whether the datacenter queue is configured to hide a requested message upon receiving the message request from the consumer worker.

According to yet further examples, a computer-readable storage medium may store instructions for locally processing queue requests from co-located workers in a datacenter. The instructions may include detecting a producer worker at a first server sending a first message to a datacenter queue at least partially stored at a second server, storing the first message at the first server, detecting a consumer worker at the first server sending a message request to the datacenter queue, and providing the stored first message to the consumer worker in response to the message request.

According to some embodiments, the instructions may further include intercepting the first message sent by the producer worker before storing the first message and/or storing the first message at the first server in a queue cache. The queue cache may include a copy or a partial copy of the datacenter queue. The instructions may further include building a table of queue usage based on at least one observed datacenter queue request and/or observing the at least one observed datacenter queue request.

According to other embodiments, the producer worker and the consumer worker may be co-located on a multi-core device at the first server and/or executed on different virtual machines, the different virtual machines configured to execute on the same physical hardware. The instructions may further include receiving a signal from a command channel associated with the datacenter queue and modifying the stored first message in response to receiving the signal. Modifying the stored first message may include deleting the first message.

According to further embodiments, the instructions may further include intercepting the message request from the consumer worker to the datacenter queue, forwarding the message request to the datacenter queue if a first criterion is met, and refraining from forwarding the message request to the datacenter queue if the first criterion is not met. The first criterion may include whether the datacenter queue is configured to hide a requested message upon receiving the message request from the consumer worker.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to locally process queue requests from co-located workers in a datacenter, the method comprising:
    detecting a producer worker at a first server sending a first message to a datacenter queue at least partially stored at a second server;
    storing the first message in a queue cache at the first server, wherein the queue cache includes one of a copy and a partial copy of the datacenter queue;
    detecting a consumer worker at the first server sending a message request to the datacenter queue;
    providing the stored first message to the consumer worker in response to the message request;
    receiving a signal from a command channel associated with the datacenter queue; and
    modifying the stored first message in response to receiving the signal.

2. The method of claim 1, further comprising intercepting the first message sent by the producer worker before storing the first message.

3. The method of claim 1, wherein the producer worker and the consumer worker are co-located on a multi-core device at the first server.

4. The method of claim 1, wherein the producer worker and the consumer worker are executed on different virtual machines, the different virtual machines configured to execute on the same physical hardware.

5. The method of claim 1, wherein modifying the stored first message includes deleting the first message.

6. The method of claim 1, further comprising:
    intercepting the message request from the consumer worker to the datacenter queue;
    forwarding the message request to the datacenter queue if a first criterion is met; and
    refraining from forwarding the message request to the datacenter queue if the first criterion is not met.

7. The method of claim 6, wherein the first criterion includes whether the datacenter queue is configured to hide a requested message upon receiving the message request from the consumer worker.

8. A virtual machine manager (VMM) to locally process queue requests from co-located workers in a datacenter, the VMM comprising:
    a queue usage detector module configured to:
        detect a producer worker at a first server, wherein the producer worker sends a first message to a datacenter queue at least partially stored at a second server; and
        detect a consumer worker at the first server, wherein the consumer worker sends a message request to the datacenter queue, and wherein the producer worker and the consumer worker are co-located on a multi-core device at the first server; and
    a processing module configured to:
        intercept the first message sent by the producer worker;
        store the first message at the first server;

provide the stored first message to the consumer worker in response to the message request;

receive a signal from a command channel associated with the datacenter queue; and modify the stored first message in response to receiving the signal.

9. The VMM of claim 8, wherein the processing module is further configured to build a table of queue usage based on at least one observed datacenter queue request.

10. The VMM of claim 9, wherein the queue usage detector module is further configured to observe the at least one observed datacenter queue request.

11. The VMM of claim 8, wherein the producer worker and the consumer worker are executed on different virtual machines, the different virtual machines configured to execute on the same physical hardware.

12. The VMM of claim 8, wherein the processing module is further configured to:

intercept the message request from the consumer worker to the datacenter queue;

forward the message request to the datacenter queue if a first criterion is met; and refrain from forwarding the message request to the datacenter queue if the first criterion is not met.

13. The VMM of claim 12, wherein the first criterion includes whether the datacenter queue is configured to hide the requested message upon receiving the message request from the consumer worker.

14. A cloud-based datacenter configured to locally process queue requests from co-located workers in the datacenter, the datacenter comprising:

a first and a second virtual machine (VM) operable to be executed on one or more physical machines; and a datacenter controller configured to:

detect a producer worker that is executed on a first VM and sends a first message to a datacenter queue at least partially stored at a first datacenter location;

intercept the first message sent by the producer worker before storing the first message;

store the first message in a queue cache at a second datacenter location different from the first;

detect a consumer worker that is executed on a second VM and sends a message request to the datacenter queue;

provide the stored first message to the consumer worker in response to the message request, wherein the first message is stored and provided from within a server to the producer worker and the consumer worker;

receive a signal from a command channel associated with the datacenter queue; and modify the stored first message in response to receiving the signal.

15. The datacenter of claim 14, wherein the controller is further configured to intercept the first message sent by the producer worker before storing the first message.

16. The datacenter of claim 14, wherein the queue cache includes one of a copy and a partial copy of the datacenter queue.

17. The datacenter of claim 14, wherein the controller is further configured to build a table of queue usage based on at least one observed datacenter queue request.

18. The datacenter of claim 17, wherein the controller is further configured to observe the at least one observed datacenter queue request.

19. The datacenter of claim 14, wherein the producer worker and the consumer worker are co-located on a multi-core device at the first datacenter location.

20. The datacenter of claim 14, wherein the first and second VMs are configured to execute on the same physical machine.

21. The datacenter of claim 14, wherein the controller is further configured to modify the stored first message by deleting the first message.

22. The datacenter of claim 14, wherein the controller is further configured to:

intercept the message request from the consumer worker to the datacenter queue;

forward the message request to the datacenter queue if a first criterion is met; and refrain from forwarding the message request to the datacenter queue if the first criterion is not met.

23. The datacenter of claim 22, wherein the first criterion includes whether the datacenter queue is configured to hide the requested message upon receiving the message request from the consumer worker.

* * * * *

UNITED STATES PATENT AND TRADEMARK OFFICE
CERTIFICATE OF CORRECTION

PATENT NO. : 8,954,993 B2
APPLICATION NO. : 14/009101
DATED : February 10, 2015
INVENTOR(S) : Kruglick Page 1 of 2

It is certified that error appears in the above-identified patent and that said Letters Patent is hereby corrected as shown below:

On Title Page 2, in item (56), under "OTHER PUBLICATIONS", in Column 1, Line 11, delete "et al," and insert -- et al., --, therefor.

In the Drawings

In Fig. 5, Replace the Figure with the attached Replacement sheet.

In the Specification

In Column 1, Line 3, below Title, insert -- CROSS REFERENCE TO RELATED APPLICATIONS --.

In Column 3, Line 66, delete "aggregation routers 228" and insert -- aggregation routers 224 --, therefor.

In Column 4, Line 53, delete "machine 232" and insert -- machine --, therefor.

In Column 8, Lines 3-4, delete "data 530" and insert -- data 531 --, therefor.

In Column 10, Line 46, delete "processor 704" and insert -- processor 504 --, therefor.

In Column 13, Line 53, delete "and or" and insert -- and/or --, therefor.

Signed and Sealed this
Twenty-first Day of July, 2015

Michelle K. Lee
*Director of the United States Patent and Trademark Office*